US012406582B2

(12) United States Patent
(10) Patent No.: US 12,406,582 B2
(45) Date of Patent: Sep. 2, 2025

Horiuchi et al.

(54) INFORMATION PROCESSING APPARATUS, MOVING OBJECT, SYSTEM, INFORMATION PROCESSING METHOD, AND COMPUTER-READABLE STORAGE MEDIUM

(71) Applicant: HONDA MOTOR CO., LTD., Tokyo (JP)

(72) Inventors: Moriya Horiuchi, Saitama (JP); Takahiro Kurehashi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 18/060,564

(22) Filed: Nov. 30, 2022

(65) Prior Publication Data

US 2023/0237912 A1 Jul. 27, 2023

(30) Foreign Application Priority Data

Jan. 24, 2022 (JP) ................................ 2022-008744

(51) Int. Cl.
*G08G 1/00* (2006.01)
*G08G 1/01* (2006.01)
*G08G 1/16* (2006.01)

(52) U.S. Cl.
CPC ........... *G08G 1/166* (2013.01); *G08G 1/0108* (2013.01); *G08G 1/0133* (2013.01)

(58) Field of Classification Search
CPC ..... G08G 1/166; G08G 1/0108; G08G 1/0133
(Continued)

(56) References Cited

U.S. PATENT DOCUMENTS

2019/0088115 A1 3/2019 Tanabe
2021/0281968 A1 9/2021 Kurehashi
(Continued)

FOREIGN PATENT DOCUMENTS

CN 109155108 A 1/2019
JP 2018181088 A 11/2018
(Continued)

OTHER PUBLICATIONS

"A scheduling algorithm for autonomous driving tasks on mobile edge computing servers," Hongjun Dai, Xiangyu Zeng, Zhilou Yu, Tingting Wang, Journal of Systems Architecture, p. 14-23, whole document (Year: 2019).*
(Continued)

*Primary Examiner* — Tiffany P Young

(57) ABSTRACT

There is provided an information processing apparatus including: a receiving control unit configured to perform a control to receive information indicating a risk area ahead in a movement direction of a moving object, from a server configured to retain information relating to a risk area; a prediction unit configured to predict a change in the movement direction of the moving object; and a determination unit configured to determine whether the movement direction of the moving object has been changed to the direction predicted by the prediction unit, in which the receiving control unit is configured to perform a control to receive the information indicating the risk area, when the determination unit determines that the movement direction of the moving object has been changed to the direction predicted by the prediction unit.

20 Claims, 8 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 2022/0194368 A1* | 6/2022 | Nemoto | H04W 4/46 | |
| 2023/0298468 A1* | 9/2023 | Jha | G08G 1/164 | 701/117 |

FOREIGN PATENT DOCUMENTS

| | | |
|---|---|---|
| JP | 2021140470 A | 9/2021 |
| WO | 2019003602 A1 | 1/2019 |
| WO | 2021005392 A1 | 1/2021 |

OTHER PUBLICATIONS

"Performance of Vehicle-to-Vehicle Communication using IEEE 802.11p in Vehicular Ad-hoc Network Environment," Vaishali D. Khairnar, Dr. Ketan Kotecha, Research Scholar Institute of Technology Nirma University Ahmadabad, p. 143-170, whole document. (Year: 2013).*

Office Action issued for counterpart Chinese Application 202211657272.X, issued by The State Intellectual Property Office of People's Republic of China on Jul. 29, 2025.

* cited by examiner

INFORMATION PROCESSING APPARATUS, MOVING OBJECT, SYSTEM, INFORMATION PROCESSING METHOD, AND COMPUTER-READABLE STORAGE MEDIUM

The contents of the following Japanese patent application (s) are incorporated herein by reference:
NO. 2022-008744 filed in JP on Jan. 24, 2022.

BACKGROUND

1. Technical Field

The present invention relates to an information processing apparatus, a moving object, a system, an information processing method, and a computer-readable storage medium.

2. Related Art

Patent document 1 discloses a system in which an MEC server manages a risk area and the MEC server provides information of the risk area to each vehicle.

Prior Art Document

Patent Document 1: Japanese Patent Application Publication No. 2021-140470

DESCRIPTION OF EXEMPLARY EMBODIMENTS

Hereinafter, (some) embodiment(s) of the present invention will be described. The embodiment(s) do(es) not limit the invention according to the claims. In addition, not all of the combinations of features described in the embodiments are essential to the solution of the invention.

Figure 1:
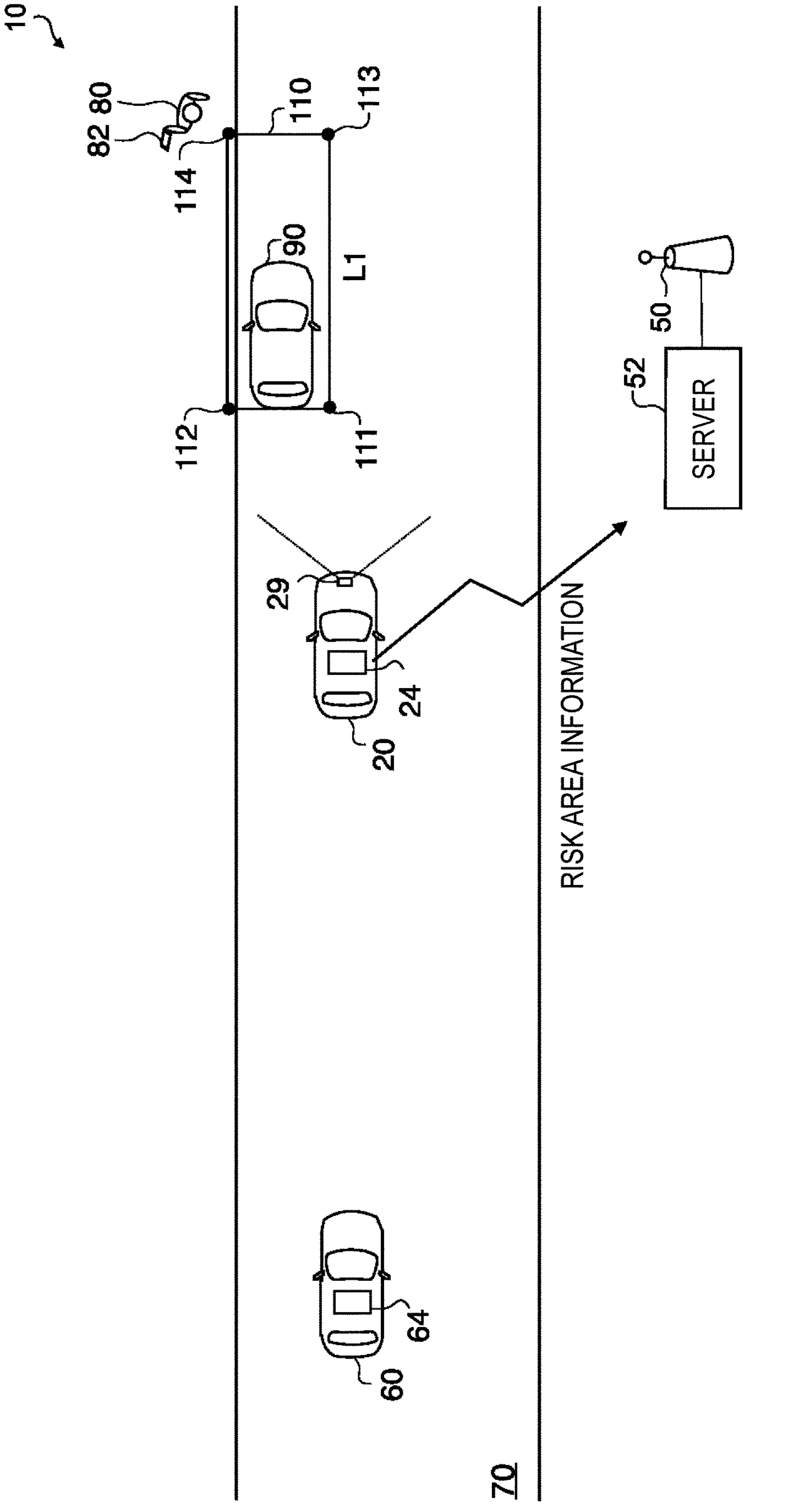
FIG. 1 schematically shows a scene where a system 10 is used.

FIG. 1 schematically shows a scene where a system 10 is used. The system 10 includes a vehicle 20, a vehicle 60, a terminal 82, a base station 50, and a server 52.

The vehicle 20 and the vehicle 60 are vehicles traveling on a road 70. The vehicle 20 and the vehicle 60 are examples of a moving object. The vehicle 20 includes an information processing apparatus 24 and a sensor 29. The sensor 29 is configured to include a camera. The information processing apparatus 24 has a function of processing information acquired by the sensor 29, and a communication function with the server 52. The vehicle 20 is, for example, a vehicle that has an advanced driver assistance system (ADAS) function. The vehicle 60 includes an information processing apparatus 64. The information processing apparatus 64 has the communication function with the server 52. The vehicle 60 is, for example, a vehicle that does not have the ADAS function.

The terminal 82 is a terminal possessed by a person 80. The terminal 82 is, for example, a mobile terminal such as a smartphone. The base station 50 is a base station for a mobile communication. The server 52 is a server connected to the base station 50. The server 52 may include, for example, an edge computing server such as a mobile edge computing (MEC) server. The server 52 continuously manages location information of the terminal 82. It should be noted that one server 52 is illustrated in FIG. 1, but the server 52 may be constituted by a plurality of servers respectively connected to a plurality of base stations on a one to one basis. The information processing apparatus 24 may communicate with a server near the vehicle 20 among the plurality of servers constituting the server 52, and the information processing apparatus 64 may communicate with a server near the vehicle 60 among the plurality of servers constituting the server 52.

In FIG. 1, the vehicle 20 and the vehicle 60 are vehicles travelling along the road 70. A vehicle 90 is a vehicle parked on the road 70. The vehicle 60 is traveling behind the vehicle 20 in the same advance direction as the vehicle 20.

For the vehicle 20, an area 110 on an advance direction side of the vehicle 20 further than the parked vehicle 90 is an area that is difficult to visually recognize from a location of the vehicle 20. The information processing apparatus 24 identifies, as a risk area, the area 110 that is out of visibility from the vehicle 20, from information such as an image which is ahead in an advance direction and is acquired by the sensor 29.

For example, the information processing apparatus 24 determines total four vertices of a vertex 111, a vertex 112, a vertex 113, and a vertex 114 of the rectangular area 110 including a location of the vehicle 90 based on recognition information of the image acquired by the sensor 29. The vertex 113 is a point away from the vertex 111 by a distance L1 in the advance direction of the vehicle 20, the vertex 111 being determined based on the recognition information of the image. The vertex 114 is a point away from the vertex 112 by the distance L1 in the advance direction of the vehicle 20, the vertex 112 being determined based on the recognition information of the image. The L1 is a distance determined according to a vehicle speed of the vehicle 20. The information processing apparatus 24 determines the vertex 111 and the vertex 113 such that a line segment connecting the vertex 111 and the vertex 113 is parallel to the advance direction of the vehicle 20 and that the line segment connecting the vertex 111 and the vertex 113 is located outside a region where the vehicle 90 recognized by the sensor 29 is present. In addition, the information processing apparatus 24 determines the vertex 111 and the vertex 112 such that a line segment connecting the vertex 111 and the vertex 112 is substantially orthogonal to the advance direction of the vehicle 20 and that the line segment connecting the vertex 111 and the vertex 112 is located outside the region where the vehicle 90 recognized by the sensor 29 is present.

When the information processing apparatus 24 inquires of the server 52 whether the terminal 82 is present within the area 110, the information processing apparatus 24 transmits, to the server 52, risk area information including the total four vertices of the vertex 111, the vertex 112, the vertex 113, and the vertex 114. In the example of FIG. 1, no terminal is present in the area 110 defined by the total four vertices of the vertex 111, the vertex 112, the vertex 113, and the vertex 114, and thus the server 52 either discards the risk area information, or transmits, to the vehicle 20, response information to the effect that the terminal 82 is not present. The server 52 stores the total four vertices of the vertex 111, the vertex 112, the vertex 113, and the vertex 114 which are included in the risk area information received from the information processing apparatus 24.

Figure 2:
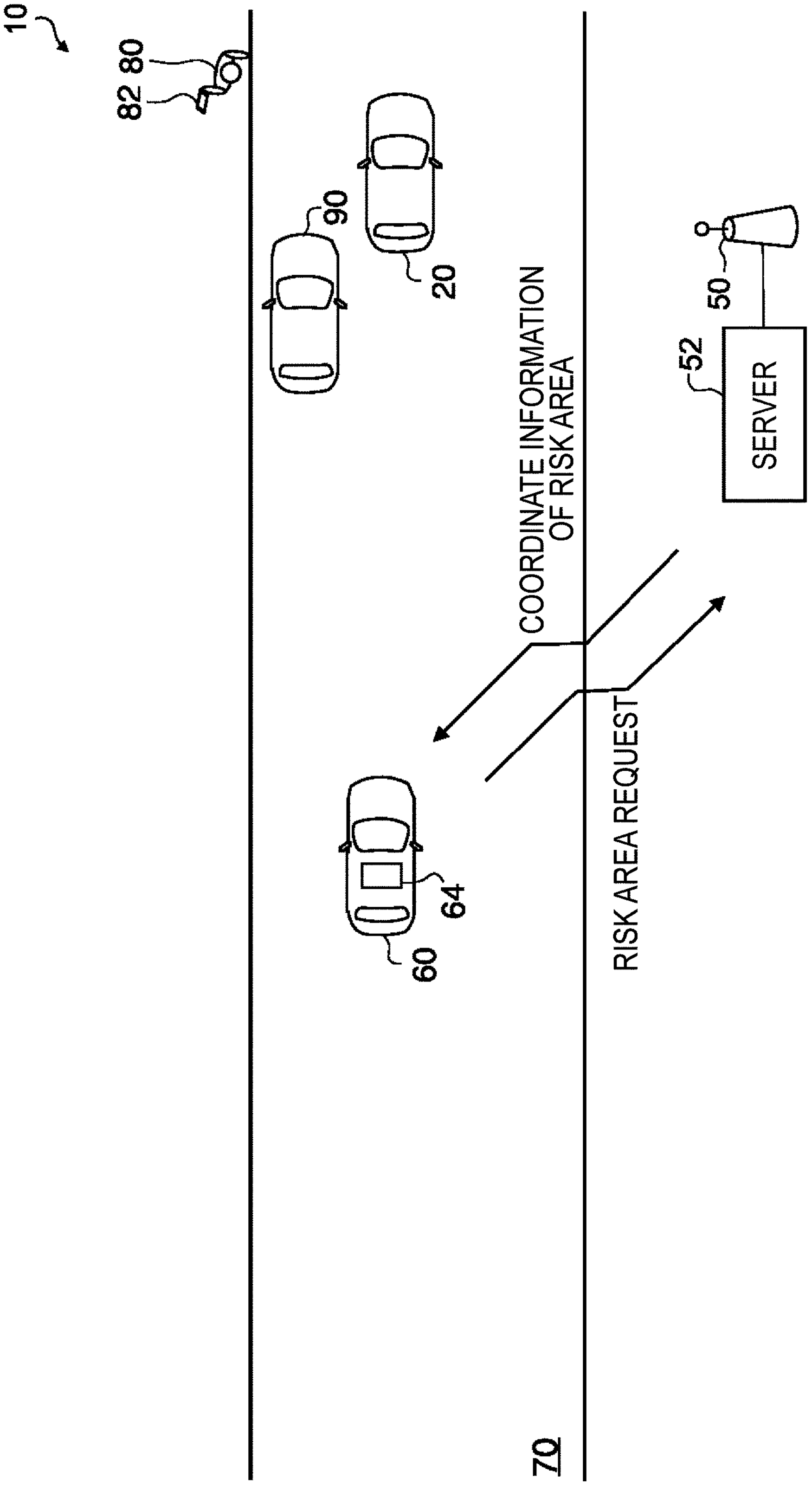
FIG. 2 shows a situation in which an information processing apparatus 64 included in a vehicle 60 requests location information of a risk area.

FIG. 2 shows a situation in which an information processing apparatus 64 included in a vehicle 60 requests location information of a risk area. When the information processing apparatus 64 is present in an area where a communication with the server 52 is possible, the information processing apparatus 64 transmits a risk area request to the server 52. The server 52 transmits, to the information processing apparatus 64, stored coordinate information of the vertex 111 and the vertex 112 of the area 110, as response information to the risk area request. The information processing apparatus 64 stores the coordinate information of the vertex 111 and the vertex 112 received from the server 52.

Figure 3:
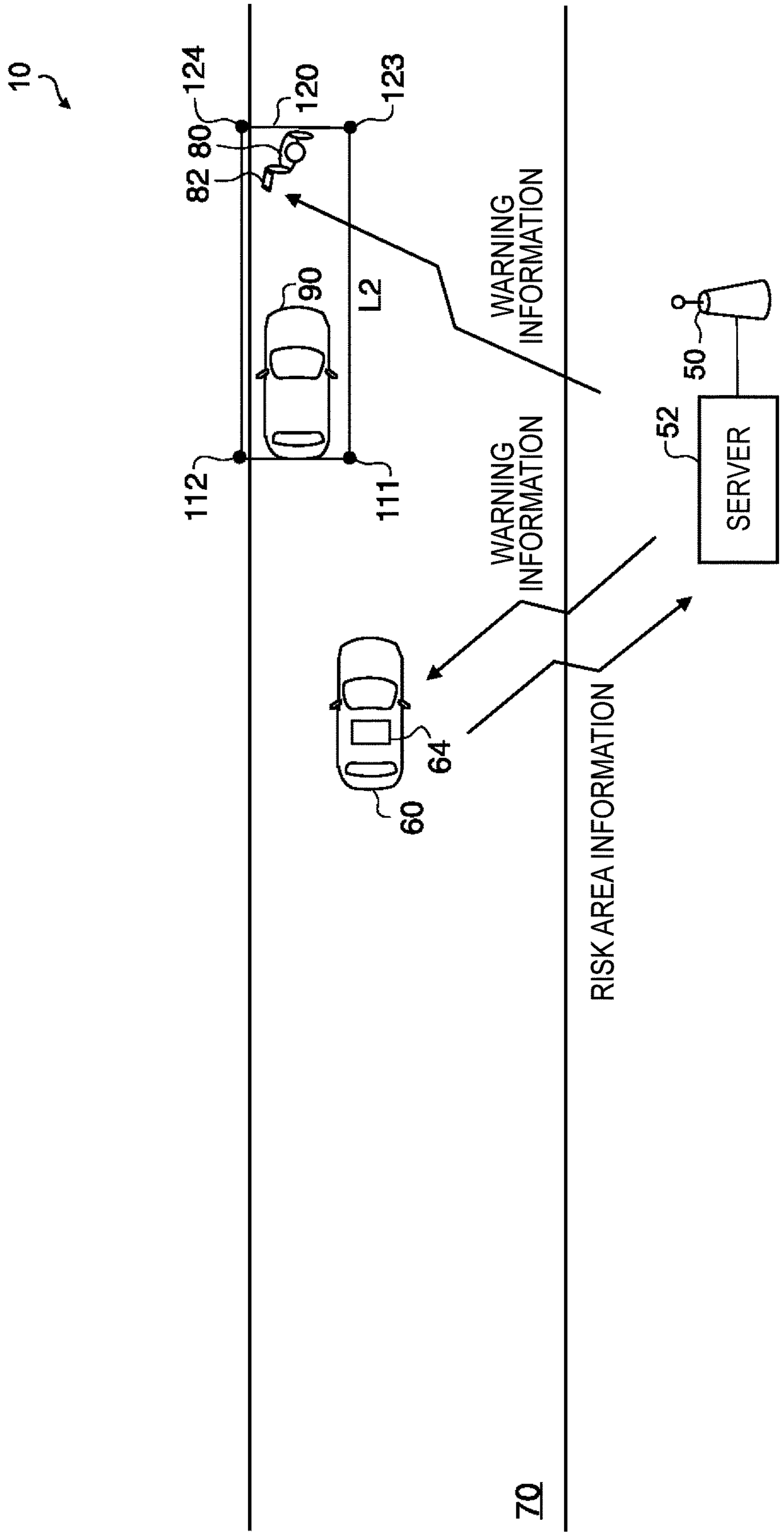
FIG. 3 shows a situation in which the information processing apparatus 64 makes an inquiry relating to the risk area.

FIG. 3 shows a situation in which the information processing apparatus 64 makes an inquiry relating to the risk area. When a distance of the vehicle 20 to a location which is indicated by the coordinate information of at least one of the vertex 111 or the vertex 112, is less than a predetermined distance, the information processing apparatus 64 set an area 120 that is defined by the vertex 111, the vertex 112, a vertex 123, and a vertex 124, as a risk area for the vehicle 60. For example, the information processing apparatus 64 sets, as the vertex 123, a point away from the vertex 111 in an advance direction of the vehicle 60, by a distance L2 determined according to a vehicle speed of the vehicle 60, and sets, as the vertex 124, a point away from the vertex 112 in the advance direction of the vehicle 60, by the distance L2. The information processing apparatus 64 determines the vertex 123 and the vertex 124, in a method similar to a method in which the information processing apparatus 24 determines the vertex 113 and the vertex 114.

The information processing apparatus 64 transmits, to the server 52, the risk area information including coordinate information of the vertex 111, the vertex 112, the vertex 123, and the vertex 124 of the area 120 set as the risk area. The server 52 transmits warning information to the information processing apparatus 64 and the terminal 82, when the location information of the terminal 82 that is managed by the server 52 is included in the area 120 surrounded by the vertices which are included in the risk area information. When the warning information is received from the server 52, the information processing apparatus 64 outputs a warning to an occupant of the vehicle 60. For example, the information processing apparatus 64 outputs the warning to the occupant through an HMI (Human Machine Interface) function of the vehicle 20. This makes it possible for the information processing apparatus 64 to output the warning by using the risk area information received from the server 52 by a wireless communication function, even though the information processing apparatus 64 itself has a function of recognizing the risk area by sensing means such as a camera. In addition, when the warning information is received from the server 52, the terminal 82 outputs the warning to the person 80. For example, the terminal 82 outputs the warning to the person 80 through the HMI function of the terminal 82.

Figure 4:
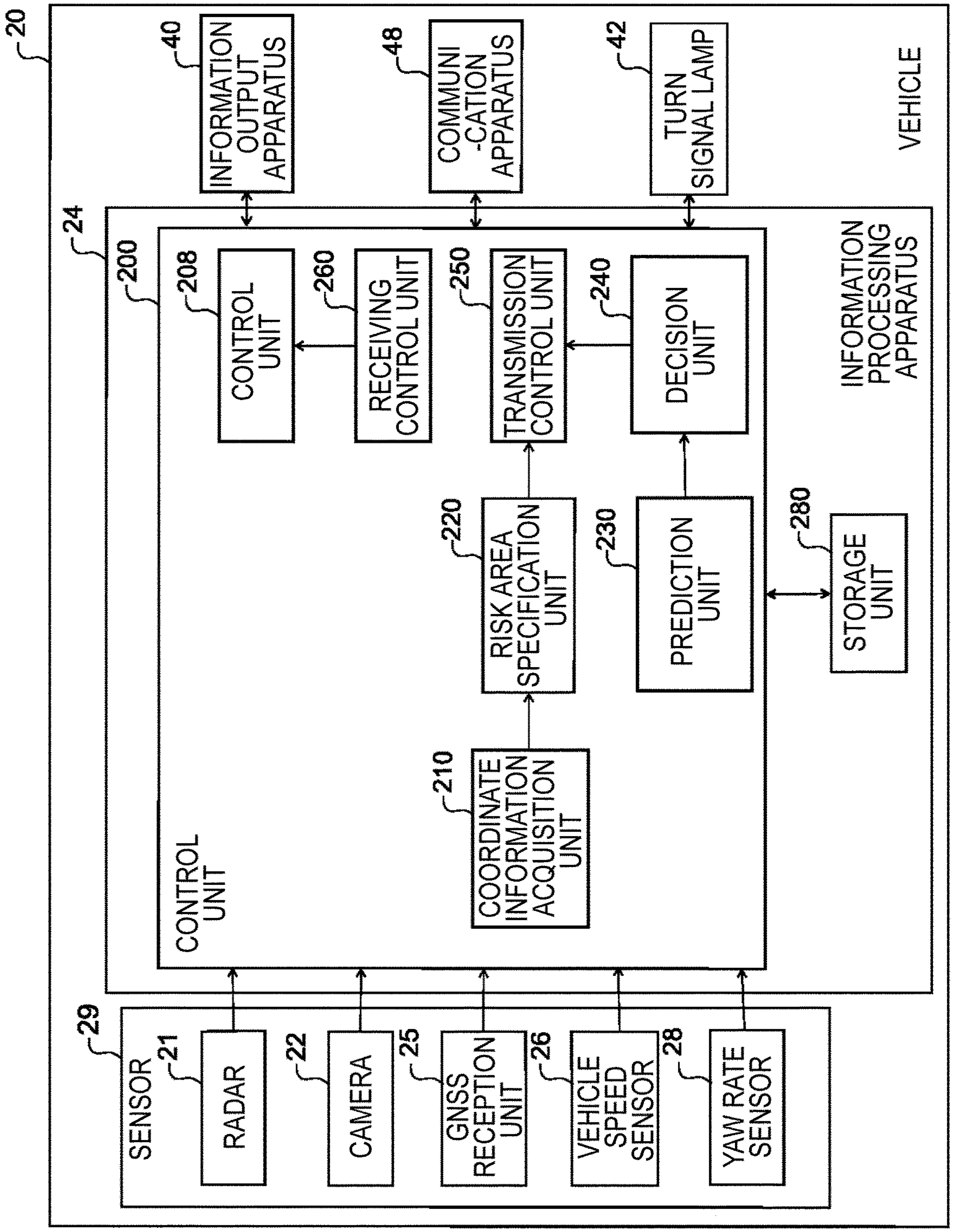
FIG. 4 shows a system configuration of a vehicle 20.

In this way, the server 52 can collect the coordinate information of the risk area from the vehicle, and provide the coordinate information of the risk area to another vehicle. In FIG. 4 and subsequent figures, a description will be made mainly by using processing of the vehicle 20 acquiring the coordinate information of the risk area from the server 52.

FIG. 4 shows a system configuration of a vehicle 20. The vehicle 20 includes the sensor 29, the information processing apparatus 24, a communication apparatus 48, an information output apparatus 40, and a turn signal lamp 42.

The sensor 29 includes a radar 21, a camera 22, a GNSS receiving unit 25, a vehicle speed sensor 26, and a yaw rate sensor 28. The radar 21 may be a LiDAR, a millimeter wave radar, or the like. The GNSS receiving unit 25 receives a radio wave transmitted from a GNSS (Global Navigation Satellite System) satellite. The GNSS receiving unit 25 generates information indicating a current location of the vehicle 20 based on a signal received from the GNSS satellite. The camera 22 is an example of an image capturing apparatus that is mounted on the vehicle 20. The camera 22 captures an image around the vehicle 20 to generate image information. For example, the camera 22 captures the image ahead in the advance direction of the vehicle 20 to generate the image information. The camera 22 may be a monocular camera. The camera 22 may be a compound eye camera, and may be a camera capable of acquiring distance information to an object. The camera 22 recognizes the object based on an image acquired by an image capturing function, and outputs location information of the recognized object. The vehicle speed sensor 26 detects the vehicle speed of the vehicle 20. The yaw rate sensor 28 detects a rate of change of a rotation angle of the vehicle 20 in a turning direction.

It should be noted that the vehicle 20 may include a driver assistance control apparatus that uses the information detected by the sensor 29 to perform driver assistance for the vehicle 20. The driver assistance control apparatus may be realized by an ECU that provides the ADAS function.

The communication apparatus 48 is responsible for the communication with server 52. The communication apparatus 48 may communicate with the server 52 by the mobile communication. The communication apparatus 48 may be capable of communicating, for example, through a communication (Uu) interface via a portable base station for a vehicle-to-vehicle communication.

The information output apparatus 40 is an apparatus that outputs alert information. The information output apparatus 40 may have the HMI function. The information output apparatus 40 may include a head-up display or a navigation system. The information output apparatus 40 may be a mobile terminal possessed by the occupant of the vehicle 20. The information output apparatus 40 may include a voice output apparatus that outputs the alert information by a voice. The turn signal lamp 42 blinks according to an operation of the occupant of the vehicle 20 or the like.

The information processing apparatus 24 includes a control unit 200 and a storage unit 280. The control unit 200 is realized, for example, by a circuit of a calculation processing apparatus or the like including a processor. The storage unit 280 is realized by including a non-volatile storage medium. The control unit 200 performs processing by using information stored in the storage unit 280. The control unit 200 may be realized by an ECU (Electronic Control Unit) including a microcomputer including a CPU, a ROM, a RAM, an I/O, a bus, and the like.

The control unit 200 includes a coordinate information acquisition unit 210, a risk area identification unit 220, a prediction unit 230, a determination unit 240, a control unit

208, a transmission control unit 250, and a receiving control unit 260. It should be noted that a mode in which the control unit 200 does not have some function of functional blocks shown in FIG. 4, may be adopted. For example, a mode in which only some function is implemented in the control unit 200, and another function is implemented as a function of the sensor 29 or another circuit, or the like, may be adopted.

The risk area identification unit 220 is configured to identify the risk area outside the vehicle 20. The transmission control unit 250 is configured to perform a control to transmit the risk area information indicating the risk area identified by the risk area identification unit 220, to the server 52 configured to retain information relating to the risk area.

It should be noted that the risk area may be an area that is outside the vehicle 20 and that poses a risk according to a movement of the vehicle 20. The risk area may be an area that is out of visibility from the location of the vehicle 20 by an object outside the vehicle 20. Information of the area that is out of visibility is, for example, location information of an area which is blocked for an occlusion to occur by a three-dimensional object such as another vehicle, a building, and a roadside tree, when viewed from the location of the vehicle 20.

The coordinate information acquisition unit 210 acquires the coordinate information of the object recognized from the image of the outside of the vehicle 20, the image being captured by the camera 22 mounted on the vehicle 20. The risk area identification unit 220 may identify the risk area based on the coordinate information of the object recognized from the image of the outside of the vehicle 20, the image being captured by the camera 22.

The receiving control unit 260 is configured to perform a control to receive information indicating the risk area ahead in a movement direction of the vehicle 20, from the server 52 configured to retain the information relating to the risk area. The prediction unit 230 is configured to predict a change in the movement direction of the vehicle 20. The prediction unit 230 is configured to predict the change in the movement direction of the vehicle 20 based on operation information of the turn signal lamp 42 included in the vehicle 20. The determination unit 240 is configured to determine whether the movement direction of the vehicle 20 has been changed to the direction predicted by the prediction unit 230. The receiving control unit 260 is configured to perform a control to receive the information indicating the risk area, when the determination unit 240 determines that the movement direction of the vehicle 20 has been changed to the direction predicted by the prediction unit 230.

The receiving control unit 260 is configured to perform a control to receive the information indicating the risk area at a predetermined time interval. The receiving control unit 260 is configured to perform a control to receive the information indicating the risk area, at a timing other than a timing at which the information indicating the risk area is received at the predetermined time interval, when the determination unit 240 determines that the movement direction of the vehicle 20 has been changed to the direction predicted by the prediction unit 230.

The receiving control unit 260 is configured to perform a control to discard already received information indicating the risk area, and receive the information indicating the risk area, when the determination unit 240 determines that the movement direction of the vehicle 20 has been changed to the direction predicted by the prediction unit 230.

The determination unit 240 is configured to determine that the movement direction of the vehicle 20 has been changed to the direction predicted by the prediction unit 230, in a case where an operation of the turn signal lamp 42 is stopped and then the vehicle 20 travels a distance greater than or equal to a predetermined distance. The determination unit 240 is configured to store the movement direction of the vehicle 20 in a case where the operation of the turn signal lamp 42 is started, and the determination unit 240 is configured to determine that the movement direction of the vehicle 20 has been changed to the direction predicted by the prediction unit 230, in a case where the operation of the turn signal lamp 42 is stopped and then the vehicle 20 travels a predetermined distance or more in a direction different from the stored movement direction.

The determination unit 240 may store the movement direction of the vehicle 20 in a case where the operation of the turn signal lamp 42 is started, and the determination unit 240 may determine that the movement direction of the vehicle 20 has been changed to the direction predicted by the prediction unit 230, in a case where the operation of the turn signal lamp 42 is stopped and then the vehicle 20 travels a predetermined time or more in a direction different from the stored movement direction.

It should be noted that the "movement direction of the vehicle 20" may be a travel direction of the vehicle 20. The acquisition and the prediction of the travel direction of the vehicle 20 by the prediction unit 230 and the determination unit 240 may be performed based on any combination of the GNSS signal received by the GNSS receiving unit, a signal which is output by the yaw rate sensor 28, and the operation information of the turn signal lamp 42.

The control unit 208 may control the driver assistance for the vehicle 20 or an execution of the warning to the occupant of the vehicle 20. For example, when the information output apparatus 40 includes a head-up display, the control unit 208 may cause the head-up display of the vehicle 20 to output light for forming a mark as alert information indicating that a pedestrian is present in the risk area. In addition, the control unit 208 causes the head-up display to output the light for forming the mark in a display region corresponding to a location of the risk area where the pedestrian is present. The control unit 208 may project the light for forming the mark toward a reflective member provided on a windshield of the vehicle 20. It should be noted that the control unit 208 may output the alert information by a voice or a character. In addition, the control unit 208 may control the travel of the vehicle 20 through the driver assistance control apparatus included in the vehicle 20.

Figure 5:
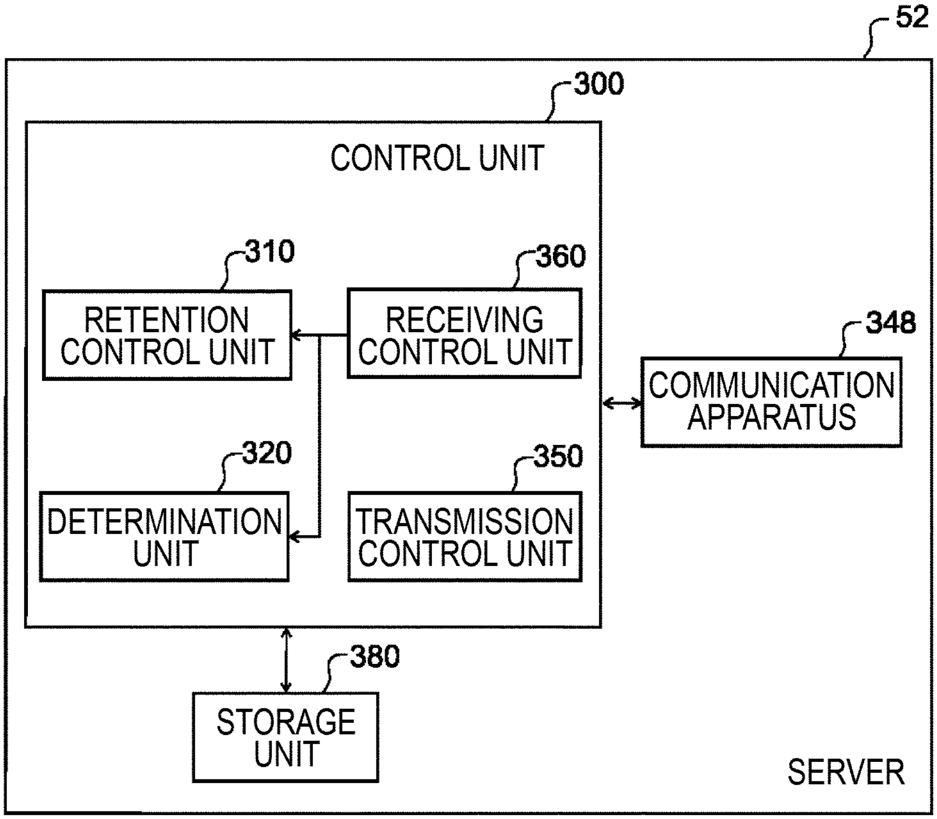
FIG. 5 shows a system configuration of a server 52.

FIG. 5 shows a system configuration of a server 52. The server 52 includes a communication apparatus 348, a control unit 300, and a storage unit 380.

The control unit 300 controls the communication apparatus 348. The communication apparatus 348 is responsible for a communication between the terminal 82 and the information processing apparatus 24. The control unit 300 is realized, for example, by a circuit of a calculation processing apparatus or the like including a processor. The storage unit 380 is realized by including a non-volatile storage medium. The control unit 300 performs processing by using information stored in the storage unit 380. The control unit 300 may be realized by a microcomputer including a CPU, a ROM, a RAM, an I/O, a bus, and the like.

The control unit 300 includes a retention control unit 310, a determination unit 320, a transmission control unit 350, and a receiving control unit 360. It should be noted that a mode in which the control unit 300 does not have some function of functional blocks shown in FIG. 5, may be adopted.

The receiving control unit 360 performs a control to receive the risk area information indicating the risk area outside the vehicle 20 identified by the vehicle 20. The retention control unit 310 performs a control to retain the information relating to the risk area. For example, the retention control unit 310 causes the storage unit 380 to store the information relating to the risk area. The risk area information includes a plurality of points that define the risk area. The retention control unit 310 performs a control to retain coordinate information of the plurality of points included in the risk area information. For example, the retention control unit 310 causes the storage unit 380 to store the coordinate information of the plurality of points included in the risk area information.

The receiving control unit 360 performs a control to periodically receive location information of a plurality of terminals including the terminal 82. The server 52 manages the location information of each of the plurality of terminals by storing, in the storage unit 380, the location information of the plurality of terminals received by the control of the receiving control unit 360.

The receiving control unit 360 receives the risk area information from the vehicle 20 or the vehicle 60. The risk area information is information that is transmitted from the vehicle 20 or the vehicle 60, and is information for inquiring whether any of the terminals whose location information is managed by the server 52 is present in the risk area. The risk area information may include all coordinates of a plurality of vertices that define the risk area. Based on the location information of the terminal that is managed by the server 52, the determination unit 320 determines whether any of the terminals is present in the risk area defined by a plurality of vertices included in the risk area information. When any of the terminals is determined to be present in the risk area, the transmission control unit 250 performs a control to transmit the response information to the effect that the terminal is present, to the vehicle 20 or the vehicle 60 that is a transmission source of the inquiry information.

Figure 6:
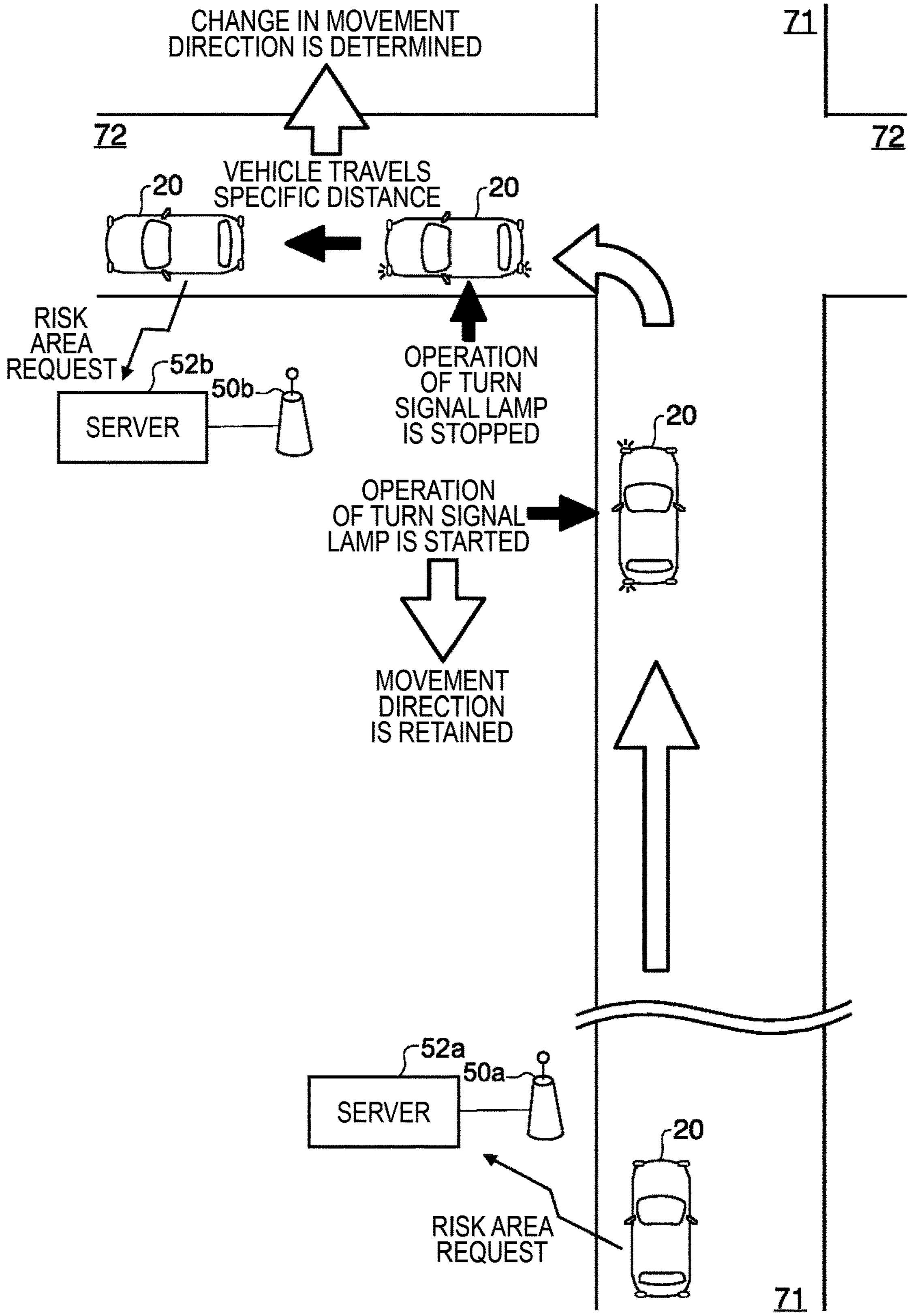
FIG. 6 shows an outline of an operation when the vehicle 20 transmits a risk area request to the server 52 according to a change in a travel path.

FIG. 6 shows an outline of an operation when the vehicle 20 transmits a risk area request to the server 52 according to a change in a travel path. FIG. 6 shows a process of the vehicle 20 changing a course from a road 71 to a road 72. A server 52*a* and a server 52*b* correspond to the server 52 described above, and a base station 50*a* and a base station 50*b* correspond to the base station 50 described above. The server 52*a* is a server provided mainly to provide each vehicle with the coordinate information of the risk area of the road 71. The server 52*b* is a server provided mainly to provide each vehicle with the coordinate information of the risk area of the road 72.

The transmission control unit 250 in the vehicle 20 periodically transmits the risk area request while the vehicle 20 is traveling on the road 71. In the example of FIG. 6, the information processing apparatus 24 of the vehicle 20 transmits the risk area request to the server 52*a* during the travel on the road 71, and receives a predetermined number of pieces of the coordinate information of the risk area on the road 71, the coordinate information being transmitted from the server 52*a*, and the information processing apparatus 24 stores the received coordinate information in the storage unit 280. As described above, the information processing apparatus 24 uses the stored coordinate information of the risk area, and sets, in a case of reaching near the risk area, the risk area information to issue the warning or the like to the terminal 82 that is present in the risk area.

The occupant of vehicle 20 operates the turn signal lamp 42 of vehicle 20, before reaching an intersection of the road 71 and the road 72, to move from the road 71 to the road 72. The prediction unit 230 predicts a future travel direction of the vehicle 20, based on the operation information of the turn signal lamp 42, according to the operation of the turn signal lamp 42 being started. For example, when the operation of the turn signal lamp 42 for turning left is started, the prediction unit 230 predicts that the vehicle 20 will move to a left direction with respect to the current travel direction, and when the operation of the turn signal lamp 42 for turning right is started, the prediction unit 230 predicts that the vehicle 20 will move to a right direction with respect to the current travel direction. In addition, the determination unit 240 stores the current travel direction of the vehicle 20, according to the operation of the turn signal lamp 42 being started.

When the left turn of the vehicle 20 is completed and the occupant of the vehicle 20 stops the operation of the turn signal lamp 42, the determination unit 240 starts measuring a travel distance of the vehicle 20 after the operation of the turn signal lamp 42 is stopped, according to the stop of the operation of the turn signal lamp 42. When the travel distance of the vehicle 20 after the operation of the turn signal lamp 42 is stopped exceeds a predetermined distance, the determination unit 240 identifies the current travel direction of the vehicle 20, and when the current travel direction of the vehicle 20 matches the travel direction predicted by the prediction unit 230 in a predetermined range, the determination unit 240 determines that the travel path of the vehicle 20 has been changed.

When the determination unit 240 determines that the travel path of the vehicle 20 has been changed, the transmission control unit 250 performs the control to transmit the risk area request to the server 52*b*. When the risk area request is received from the vehicle 20, the server 52*b* transmits a predetermined number of pieces of the coordinate information of the risk area on the road 72 as the response information to the risk area request. In the vehicle 20, when the coordinate information of the risk area on the road 72 is received by the control of the receiving control unit 260, the received coordinate information of the risk area is stored in the storage unit 280. Thereby, when the travel path is changed from the road 71 to the road 72, the vehicle 20 can acquire the information of the risk area on the road 72 that is a changed destination.

Figure 7:
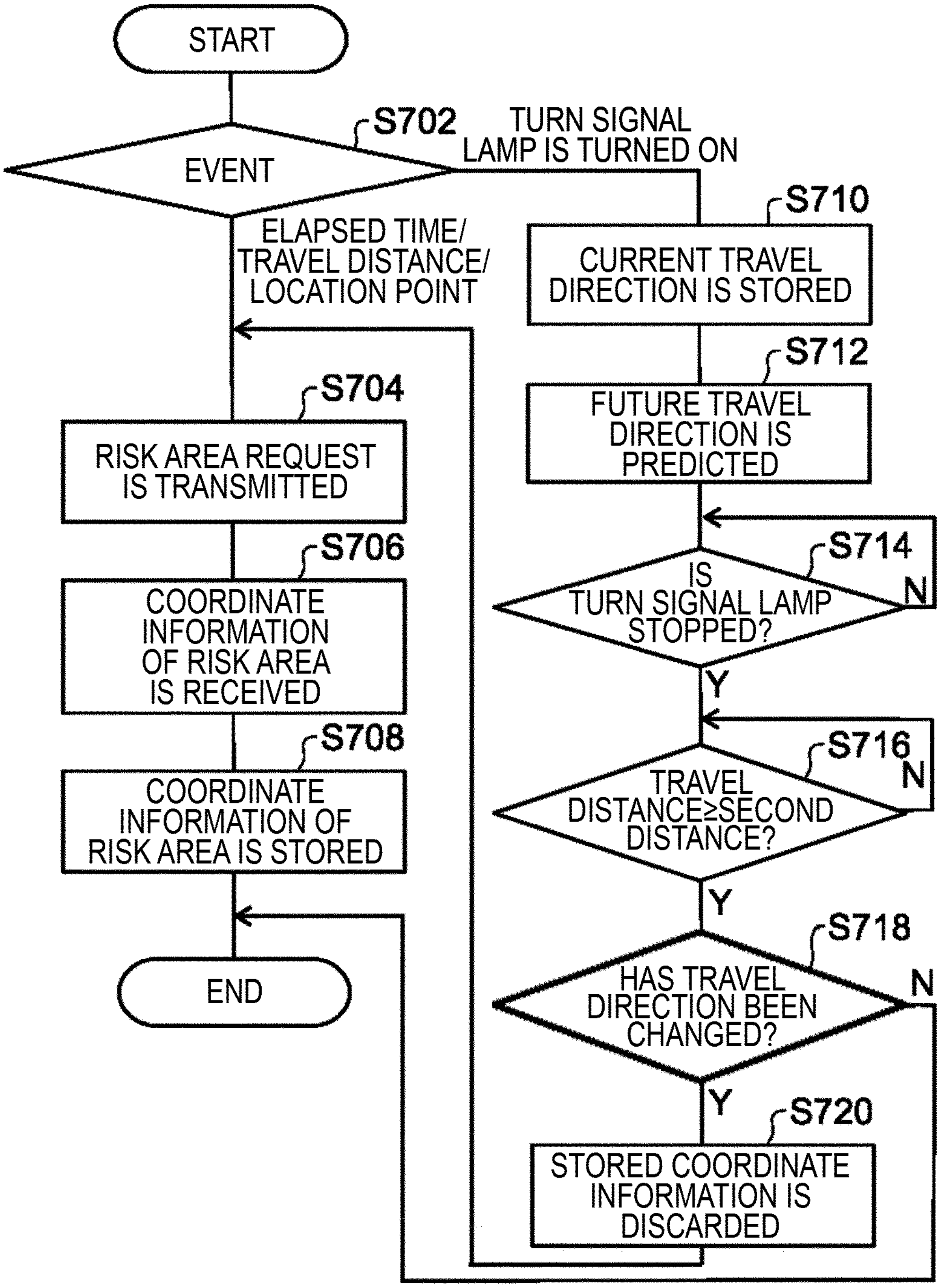
FIG. 7 shows an example of a flowchart relating to processing for an information processing apparatus 24 to receive coordinate information of the risk area.

FIG. 7 shows an example of a flowchart relating to processing for an information processing apparatus 24 to receive coordinate information of the risk area. The processing of the present flowchart is started each time a predetermined event that triggers the transmission of the risk area request occurs.

The event that triggers the transmission of the risk area request includes: an elapsed time event that occurs each time a predetermined time elapses; a "travel distance event" that occurs each time the travel distance of the vehicle 20 becomes greater than or equal to a predetermined first distance; a "location point" event that occurs by the vehicle 20 being closer to within a predetermined distance from a predetermined location point; and a "turn signal lamp ON" event that occurs by the operation of the turn signal lamp 42 being started. The elapsed time events occur, for example, every two minutes. The travel distance event occurs, for example, each time the travel distance becomes greater than or equal to a predetermined distance between 1 km and 2 km. In this way, the information processing apparatus 24 can receive the coordinate information of the risk area at least each time a predetermined time elapses. In addition, the information processing apparatus 24 can receive the coordinate information of the risk area at least each time the travel distance of the vehicle 20 becomes greater than or equal to the first distance. In addition, the information processing apparatus 24 can receive the coordinate information of the risk area each time the vehicle 20 becomes closer to within a predetermined distance from a predetermined inquiry location point.

If the event that triggers the transmission of the risk area request occurs, the determination unit 240 determines a type of event that has occurred, in S702. If the elapsed time event or the travel distance event occurs, the communication apparatus 48 transmits, by the control of the transmission control unit 250, the risk area request to the server 52, in S704. In S706, the communication apparatus 48 receives, by the control of the receiving control unit 260, the coordinate information of the risk area which is transmitted from the server 52. In S708, the storage unit 380 stores the coordinate information of the risk area. This makes it possible to receive the latest coordinate information of the risk area, periodically or each time the travel distance of the vehicle 20 becomes greater than or equal to the first distance.

If the turn signal lamp ON event is determined to have occurred in the determination of S702, the determination unit 240 stores the current travel direction of the vehicle 20, in S712. Subsequently, in S712, the prediction unit 230 predicts the future travel direction of the vehicle 20 based on the operation information of the turn signal lamp 42. For example, the prediction unit 230 predicts the future travel direction of the vehicle 20 from the current travel direction stored in S710, and a relative change direction for the future travel direction which is determined from the operation information of the turn signal lamp 42.

Subsequently, in S714, the determination unit 240 waits until the operation of the turn signal lamp 42 is stopped. When the turn signal lamp 42 is stopped, the determination unit 240 waits until the travel distance of the vehicle 20 after the operation of the turn signal lamp 42 is stopped becomes greater than or equal to a predetermined second distance, in S716. For example, the determination unit 240 waits until the travel distance of the vehicle 20 after the operation of the turn signal lamp 42 is stopped becomes 10 m or more. It should be noted that the second distance is shorter than the first distance.

If the travel distance of the vehicle 20 after the operation of the turn signal lamp 42 is stopped is determined to become greater than or equal to the second distance by S716, the determination unit 240 determines whether the travel direction of the vehicle 20 has been changed to the predicted direction, in S718. For example, if the current travel direction of the vehicle 20 matches the travel direction predicted in S712, the determination unit 240 determines that the travel direction of the vehicle 20 has been changed to the predicted direction. As an example, if a difference between the current travel direction of the vehicle 20 and the travel direction predicted in S712 is in a predetermined range, the current travel direction of the vehicle 20 may be determined to match the travel direction predicted in S712.

If the travel direction of the vehicle 20 is determined to have been changed as predicted in S718, the coordinate information of the risk area received in the past and stored in the storage unit 380 is discarded, in S720, and processing proceeds to S704. This makes it possible for the information processing apparatus 24 to transmit the risk area request, to receive the coordinate information of the risk area, and to store the coordinate information of the risk area, regardless of whether the elapsed time event or the travel distance event occurs, at a timing different from a timing at which the elapsed time event or the travel distance event occurs. On the other hand, if the travel direction of the vehicle 20 is determined not to be changed as predicted in S718, the processing of the present flowchart is ended without transmitting the risk area request.

In this way, with the information processing apparatus 24, it is possible to transmit the risk area request when the travel path of the vehicle 20 is changed. On the other hand, it is possible not to transmit the risk area request when the vehicle 20 travels along a road and makes a turn, or when a lane is changed, or the like, and thus it is possible to suppress a frequent transmission of the risk area request. It should be noted that the above embodiment describes the operation of the information processing apparatus 24 transmitting the risk area request by using a scene in which the vehicle 20 turns at an intersection; however, the embodiment can be applied not only to the case of turning at an intersection, but also to a case of making a U-turn on the same road to advance in an opposite direction.

As described above, with the information processing apparatus 24, it is possible to receive, from the server 52, the coordinate information of the risk area of a path to a changed destination, according to the vehicle 20 changing the travel path. Therefore, it is possible to efficiently acquire the coordinate information of the risk area without shortening a time interval for periodically acquiring the coordinate information of the risk area. This makes it possible to reduce a load on the process of the server 52 to provide the coordinate information of the risk area to the vehicle 20.

It should be noted that the communication between the information processing apparatus 24 and the server 52 may be performed by a communication system conforming to Cellular-V2X. The Cellular-V2X includes communication systems such as LTE-V2X PC5 and 5G-V2X PC5. In another embodiment, the communication between the information processing apparatus 24 and the server 52 may adopt a mode using Wi-Fi (registered trademark) or DSRC (Dedicated Short Range Communications). For the communication between the information processing apparatus 24 and the server 52, any communication system such as Bluetooth (registered trademark) may be adopted in addition to the Cellular-V2X, the DSRC (registered trademark), or the like. The information processing apparatus 24 may communicate with the server 52 by using a communication infrastructure included in ITS (Intelligent Transport Systems: an advanced road transportation system).

It should be noted that the vehicle 20 and the vehicle 60 may be examples of transportation equipment. Examples of the transportation equipment may include an automobile such as a passenger car and a bus, a saddle riding type vehicle, and a bicycle, or the like. In addition, in the present embodiment described above, the system 10 functions as the system for issuing the warning when the terminal 82 is present in the risk area, but may function as a system for issuing the warning when any communication apparatus whose location information is able to be managed by the server 52, other than the terminal 82, is present. Such a communication apparatus may be included in any moving object such as the automobile, the saddle riding type vehicle, and the bicycle.

As described above, the present embodiment has been made by taking into account that the load on the process of the server 52 to provide the coordinate information of the risk area to the vehicle 20, increases, and a purpose of the present embodiment is to enhance traffic safety and to suppress deterioration of traffic smoothness.

Figure 8:
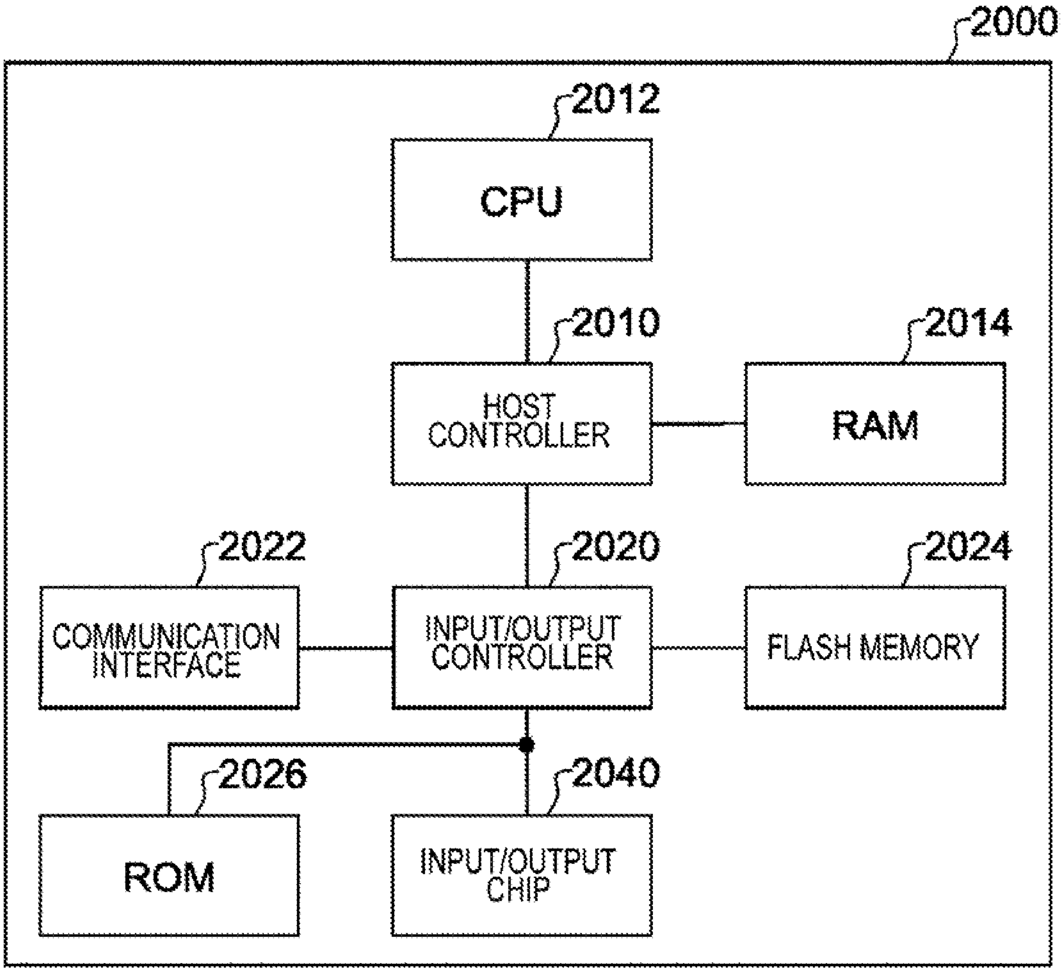
FIG. 8 shows an example of a computer 2000.

FIG. 8 shows an example of a computer 2000 in which a plurality of embodiments of the present invention may be entirely or partially embodied. A program that is installed in the computer 2000 can cause the computer 2000 to function as an apparatus such as the information processing apparatus 24 according to the embodiment or each unit of the apparatus, or can cause the computer 2000 to function as a server such as the server 52 according to the embodiment or each unit of the server, or cause the computer 2000 to execute an operation that is associated with the apparatus, each unit of the apparatus, the server, or each unit of the server, and/or can cause the computer 2000 to execute processes or steps of the processes according to the embodiment. Such a program may be executed by a CPU 2012 in order to cause the computer 2000 to execute a specific operation associated with some or all of the blocks in the processing procedure and the block diagram described in the present specification.

The computer 2000 according to the present embodiment includes the CPU 2012 and a RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, a variety of input/output units such as a keyboard, a mouse, and a monitor, via input/output ports such as a serial port, a parallel port, a keyboard port, a mouse port, a monitor port, a USB port, and an HDMI (registered trademark) port.

A program is provided via a computer-readable medium such as a CD-ROM, a DVD-ROM, or a memory card, or a network. The RAM 2014, the ROM 2026, or the flash memory 2024 is an example of the computer-readable medium. The program is installed in the flash memory 2024, the RAM 2014, or the ROM 2026, and is executed by the CPU 2012. Information processing written in the program is read by the computer 2000, thereby resulting in cooperation between the program, and the above-described various types of hardware resources. An apparatus or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing on based on the processes written in the communication program. The communication interface 2022, under the control of the CPU 2012, reads out transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Also, the CPU 2012 may cause all or required portions of a file or a database stored in the recording medium such as the flash memory 2024 to be read by the RAM 2014, and perform various types of processes on the data on the RAM 2014. The CPU 2012, then, writes back the processed data into the recording medium.

Various types of programs and various types of information such as data, tables, and databases may be stored in the recording medium to undergo information processing. The CPU 2012 may perform, on the data read from the RAM 2014, various types of processing including various types of operations, information processing, conditional judgments, conditional branching, unconditional branching, information retrievals/replacements, and the like described in the present specification and specified by an instruction sequence of the program, to write back the result into the RAM 2014. Also, the CPU 2012 may search for information in a file, a database, etc., in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, and thereby obtain the attribute value of the second attribute associated with the first attribute meeting a predetermined condition.

The program or software module described above may be stored in a computer-readable medium on the computer 2000 or near the computer 2000. A recording medium such as a hard disk or a RAM provided in a server system connected to a dedicated communication network or the Internet can be used as a computer-readable medium. The program stored in the computer-readable medium may be provided to the computer 2000 via the network.

When the computer 2000 functions as the control unit 200, a program that is installed in the computer 2000 and causes the computer 2000 to function as the control unit 200 may work on the CPU 2012 and the like to cause the computer 2000 to function as each unit of the control unit 200. Information processing written in these programs functions as each unit of the control unit 200 that is specific means by which software and the above-described various hardware resources cooperate by being read by the computer 2000. Then, by the specific means realizing calculation or processing of information according to a purpose of a use of the computer 2000 in the present embodiment, the unique control unit 200 according to the purpose of the use is constructed.

When the computer 2000 functions as the control unit 300, a program that is installed in the computer 2000 and causes the computer 2000 to function as the control unit 300 may work on the CPU 2012 and the like to cause the computer 2000 to function as each unit of the control unit 300. Information processing written in these programs functions as each unit of the control unit 300 that is specific means by which software and the above-described various hardware resources cooperate by being read by the computer 2000. Then, by the specific means realizing calculation or processing of information according to the purpose of the use of the computer 2000 in the present embodiment, the unique control unit 300 according to the purpose of the use is constructed.

A variety of embodiments have been described with reference to the block diagram and the like. In the block diagram, each block may represent (1) a step of a process in which an operation is performed, or (2) each unit of the apparatus having a role of performing the operation. Certain steps and "units" may be implemented by dedicated circuitry, programmable circuitry supplied with computer-readable instructions stored on computer-readable media, and/or processors supplied with computer-readable instructions stored on computer-readable media. The dedicated circuitry may include a digital and/or analog hardware circuit, or may include an integrated circuit (IC), and/or a discrete circuit. The programmable circuitry may include a reconfigurable hardware circuit including: logical AND, logical OR, exclusive OR (XOR), negative AND (NAND), negative OR (NOR), and other logical operation; and a memory element such as a flip-flop, a register, a field-programmable gate array (FPGA), a programmable logic array (PLA); and so on.

A computer-readable medium may include any tangible device that can store instructions to be executed by a suitable device, and as a result, the computer-readable medium having the instructions stored thereon constitutes at least a part of an article of manufacture including instructions which can be executed to create means for performing operations specified in the processing procedures or block diagrams. Examples of the computer-readable medium may include an electronic storage medium, a magnetic storage medium, an optical storage medium, an electromagnetic storage medium, a semiconductor storage medium, and the like. Specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

Computer-readable instructions may be provided to a general-purpose computer, a special-purpose computer, or a processor or programmable circuitry of other programmable data processing apparatus, locally or via a local area network (LAN), a wide area network (WAN) such as the internet, and the computer-readable instructions may be executed in order to result in means for executing operations specified by the described processing procedure or the block diagram. Examples of the processor include a computer processor, a processing unit, a microprocessor, a digital signal processor, a controller, a microcontroller, and the like.

While the embodiments of the present invention have been described, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 system
20, 60, 90 vehicle
21 radar
22 camera
24 information processing apparatus
25 GNSS receiving unit
26 vehicle speed sensor
28 yaw rate sensor
29 sensor
40 information output apparatus
42 turn signal lamp
48 communication apparatus
50 base station
52 server
64 information processing apparatus
70, 71, 72 road
80 person
82 terminal
110, 120 area
111, 112, 113, 114, 123, 124 vertex
200 control unit
208 control unit
210 coordinate information acquisition unit
220 risk area identification unit
230 prediction unit
240 determination unit
250 transmission control unit
260 receiving control unit
280 storage unit
300 control unit
310 retention control unit
320 determination unit
348 communication apparatus
350 transmission control unit
360 receiving control unit
380 storage unit
2000 computer
2010 host controller
2012 CPU
2014 RAM
2020 input/output controller
2022 communication interface
2024 flash memory
2026 ROM
2040: input/output chip

What is claimed is:

1. An information processing apparatus mounted on a vehicle, comprising:

one or more processors, wherein the one or more processors are configured to:

predict a change in a movement direction of the vehicle;

determine whether the movement direction of the vehicle has been changed to the direction predicted;

perform a control to receive information indicating a risk area ahead in the movement direction of the vehicle, from a server configured to retain information relating to a risk area, when the movement direction of the vehicle is determined to have been changed to the predicted direction;

predict the change in the movement direction of the vehicle based on operation information of a turn signal lamp included in vehicle; and determine that the movement direction of the vehicle has been changed to the predicted direction, in a case where an operation of the turn signal lamp is stopped and then the vehicle travels a distance greater than or equal to a predetermined distance.

2. The information processing apparatus according to claim 1, wherein the one or more processors are further configured to perform a control to receive the information indicating the risk area at a predetermined time interval, and perform a control to receive the information indicating the risk area, at a timing other than a timing at which the information indicating the risk area is received at the predetermined time interval, when the movement direction of the vehicle is determined to have been changed to the predicted direction.

3. The information processing apparatus according to claim 1, wherein the one or more processors are further configured to perform a control to discard already received information indicating the risk area, and receive the information indicating the risk area, when the movement direction of the vehicle is determined to have been changed to the predicted direction.

4. The information processing apparatus according to claim 1, wherein the one or more processors are further configured to store the movement direction of the vehicle in a case where the operation of the turn signal lamp is started, and determine that the movement direction of the vehicle has been changed to the predicted direction, in a case where the operation of the turn signal lamp is stopped and then the vehicle travels a predetermined distance or more in a direction different from the stored movement direction.

5. The information processing apparatus according to claim 1, wherein the one or more processors are further configured to identify a risk area outside the vehicle; and perform a control to transmit risk area information indicating the identified risk area, to the server.

6. The information processing apparatus according to claim 1, wherein the server is a mobile edge computing (MEC) server.

7. A vehicle comprising the information processing apparatus according to claim 1.

8. A system comprising:

the vehicle according to claim 7; and the server.

9. An information processing apparatus mounted on a vehicle comprising:

one or more processors, wherein the one or more processors are configured to:

predict a change in a movement direction of the vehicle;

determine whether the movement direction of the vehicle has been changed to the direction predicted;

perform a control to receive information indicating a risk area ahead in the movement direction of the vehicle, from a server configured to retain information relating to a risk area, when the movement direction of the vehicle is determined to have been changed to the predicted direction;

predict the change in the movement direction of the vehicle based on operation information of a turn signal lamp included in the vehicle; and determine that the movement direction of the vehicle has been changed to the predicted direction, in a case where an operation of the turn signal lamp is stopped and then the vehicle travels a predetermined time or more.

10. The information processing apparatus according to claim 9, wherein the one or more processors are further configured to store the movement direction of the vehicle in a case where the operation of the turn signal lamp is started, and determine that the movement direction of the vehicle has been changed to the predicted direction, in a case where the operation of the turn signal lamp is stopped and then the vehicle travels a predetermined time or more in a direction different from the stored movement direction.

11. The information processing apparatus according to claim 9, wherein the one or more processors are further configured to perform a control to receive the information indicating the risk area at a predetermined time interval, and perform a control to receive the information indicating the risk area, at a timing other than a timing at which the information indicating the risk area is received at the predetermined time interval, when the movement direction of the vehicle is determined to have been changed to the predicted direction.

12. The information processing apparatus according to claim 9, wherein the one or more processors are further configured to perform a control to discard already received information indicating the risk area, and receive the information indicating the risk area, when the movement direction of the vehicle is determined to have been changed to the predicted direction.

13. The information processing apparatus according to claim 9, wherein the one or more processors are further configured to identify a risk area outside the vehicle; and perform a control to transmit risk area information indicating the identified risk area, to the server.

14. The information processing apparatus according to claim 9, wherein the server is a mobile edge computing (MEC) server.

15. A vehicle comprising the information processing apparatus according to claim 9.

16. A system comprising:

the vehicle according to claim 15; and the server.

17. An information processing method performed by an information processing apparatus mounted on a vehicle, comprising:

predicting a change in a movement direction of the vehicle;

determining whether the movement direction of the vehicle has been changed to the predicted direction; and performing a control to receive information indicating a risk area ahead in the movement direction of the vehicle, from a server configured to retain information relating to a risk area, when the movement direction of the vehicle is determined to have been changed to the predicted direction;

predicting the change in the movement direction of the vehicle based on operation information of a turn signal lamp included in the vehicle; and determining that the movement direction of the vehicle has been changed to the predicted direction, in a case where an operation of the turn signal lamp is stopped and then the vehicle travels a distance greater than or equal to a predetermined distance.

18. A non-transitory computer-readable storage medium having stored thereon a program that causes a computer mounted on a vehicle to function as:

a receiving control unit configured to perform a control to receive information indicating a risk area ahead in a movement direction of the vehicle, from a server configured to retain information relating to a risk area;

a prediction unit configured to predict a change in the movement direction of the vehicle; and a determination unit configured to determine whether the movement direction of the vehicle has been changed to the direction predicted by the prediction unit, wherein the receiving control unit is configured to perform a control to receive the information indicating the risk area, when the determination unit determines that the movement direction of the vehicle has been changed to the direction predicted by the prediction unit;

the prediction unit is configured to predict the change in the movement direction of the vehicle based on operation information of a turn signal lamp included in the vehicle; and the determination unit is configured to determine that the movement direction of the vehicle has been changed to the direction predicted by the prediction unit, in a case where an operation of the turn signal lamp is stopped and then the vehicle travels a distance greater than or equal to a predetermined distance.

19. An information processing method performed by an information processing apparatus mounted on a vehicle, comprising:

predicting a change in a movement direction of the vehicle;

determining whether the movement direction of the vehicle has been changed to the predicted direction;

performing a control to receive information indicating a risk area ahead in the movement direction of the vehicle, from a server configured to retain information relating to a risk area, when the movement direction of the vehicle is determined to have been changed to the predicted direction;

predicting the change in the movement direction of the vehicle based on operation information of a turn signal lamp included in the vehicle; and determining that the movement direction of the vehicle has been changed to the predicted direction, in a case where an operation of the turn signal lamp is stopped and then the vehicle travels a predetermined time or more.

20. A non-transitory computer-readable storage medium having stored thereon a program that causes a computer mounted on a vehicle to function as:

a receiving control unit configured to perform a control to receive information indicating a risk area ahead in a movement direction of a vehicle, from a server configured to retain information relating to a risk area;

a prediction unit configured to predict a change in the movement direction of the vehicle; and a determination unit configured to determine whether the movement direction of the vehicle has been changed to the direction predicted by the prediction unit, wherein the receiving control unit is configured to perform a control to receive the information indicating the risk area, when the determination unit determines that the movement direction of the vehicle has been changed to the direction predicted by the prediction unit;

the prediction unit is configured to predict the change in the movement direction of the vehicle based on operation information of a turn signal lamp included in the vehicle; and the determination unit is configured to determine that the movement direction of the vehicle has been changed to the direction predicted by the prediction unit, in a case where an operation of the turn signal lamp is stopped and then the vehicle travels a predetermined time or more.

* * * * *